(12) United States Patent
Wakitani et al.

(10) Patent No.: US 6,948,577 B2
(45) Date of Patent: Sep. 27, 2005

(54) ELECTRIC VEHICLE

(75) Inventors: Tsutomu Wakitani, Wako (JP); Tsutomu Inui, Wako (JP); Hiroo Kanke, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/287,120

(22) Filed: Nov. 4, 2002

(65) Prior Publication Data

US 2003/0085063 A1 May 8, 2003

(30) Foreign Application Priority Data

| Nov. 6, 2001 | (JP) | 2001-340244 |
| Nov. 7, 2001 | (JP) | 2001-341897 |
| Nov. 28, 2001 | (JP) | 2001-362665 |
| Mar. 18, 2002 | (JP) | 2002-074940 |
| Mar. 18, 2002 | (JP) | 2002-074941 |
| Oct. 2, 2002 | (JP) | 2002-290516 |

(51) Int. Cl.$^7$ .............................. B60K 1/00; B60L 7/00
(52) U.S. Cl. ...................................... 180/65.1; 701/70
(58) Field of Search .............................. 180/65.1, 65.5; 701/22, 70; 303/19, 152, 169, 199

(56) References Cited

U.S. PATENT DOCUMENTS

| 4,716,980 A | * | 1/1988 | Butler ....................... 180/19.2 |
| 4,969,533 A | | 11/1990 | Holm et al. ................. 180/273 |
| 5,000,302 A | | 3/1991 | Takeshita .................. 192/17 R |
| 5,340,202 A | * | 8/1994 | Day .............................. 303/19 |
| 5,610,814 A | * | 3/1997 | Sugioka et al. ............... 701/22 |
| 5,923,096 A | * | 7/1999 | Manak ...................... 180/65.1 |
| 5,994,860 A | * | 11/1999 | Krueger et al. ............. 318/527 |
| 6,095,268 A | * | 8/2000 | Jones, Jr. ................... 180/65.5 |
| 6,246,944 B1 | * | 6/2001 | Maruyama ................... 701/70 |
| 6,385,522 B1 | * | 5/2002 | Pugh ........................... 701/70 |
| 6,449,882 B2 | * | 9/2002 | Kono et al. ................ 180/65.1 |
| 2001/0025441 A1 | | 10/2001 | Hanafusa et al. ............. 37/245 |

FOREIGN PATENT DOCUMENTS

| JP | 0484260 | 2/1973 |
| JP | 57017650 | 1/1982 |
| JP | 03098404 | 4/1991 |

* cited by examiner

*Primary Examiner*—Frank Vanaman
(74) *Attorney, Agent, or Firm*—Adams & Wilks

(57) ABSTRACT

An electric vehicle driven by at least one electric motor is provided. The vehicle includes a controller for controlling the electric motor and at least one braking device. The controller gradually reduces the rotational speed of the electric motor in accordance with a vehicle drive stop instruction, and operates the braking device when the rotational speed of the electric motor is equal to or lower than a predetermined rotational speed to stop the travel of the vehicle.

5 Claims, 10 Drawing Sheets

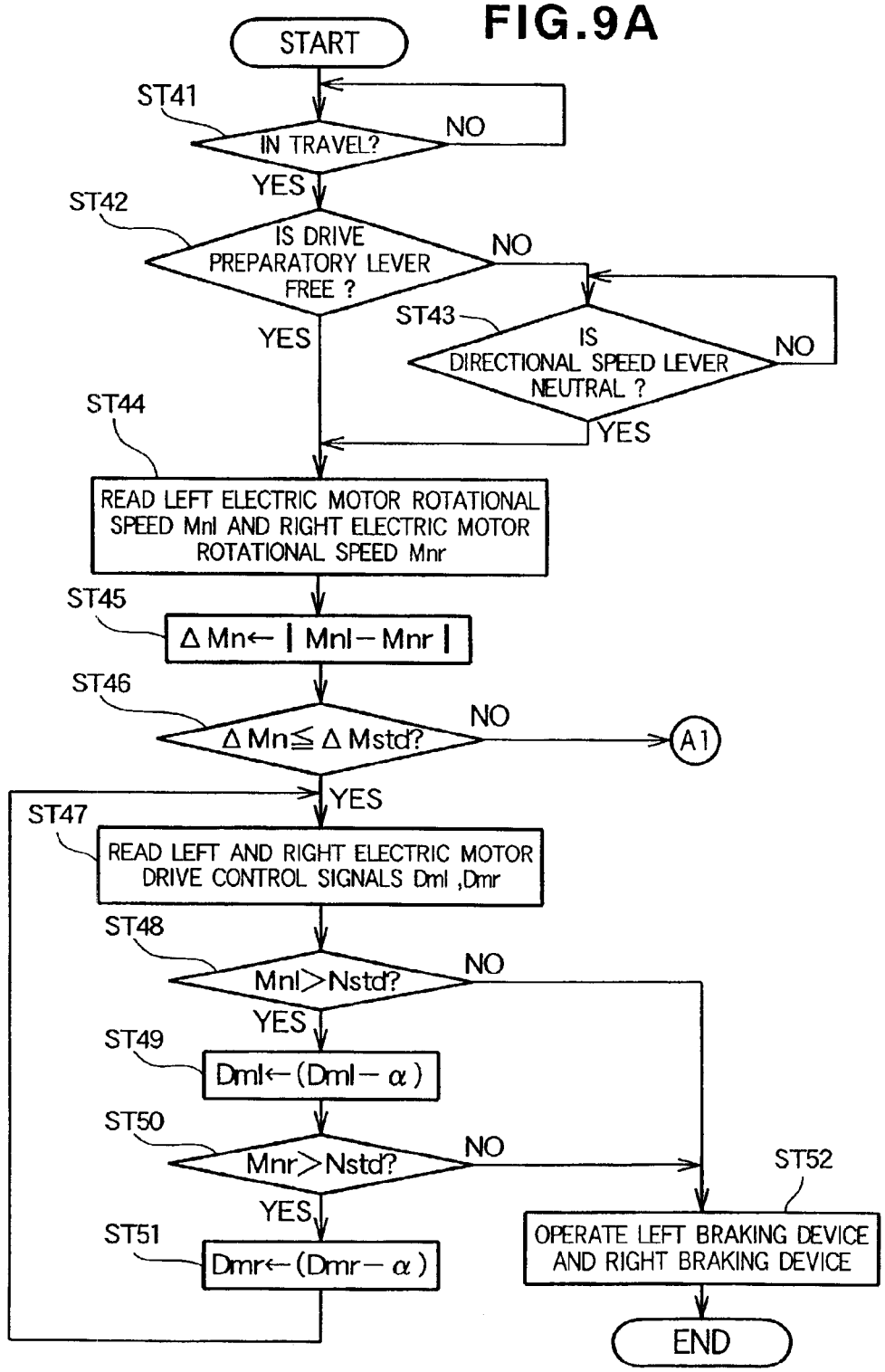

ELECTRIC VEHICLE

FIELD OF THE INVENTION

The present invention relates to an improvement in electric vehicles driven by an electric motor and, more particularly, to brake control of the electric motor.

BACKGROUND OF THE INVENTION

An electric vehicle of this kind is disclosed, for example, in Japanese Patent Laid-Open Publication No. HEI-3-98404 entitled "Compact Electric Vehicle." This electric vehicle includes an electric motor as a driving source and a deenergization-operating-type electromagnetic brake which releases the brake when being energized and applies the brake when not being energized. The electromagnetic brake releases the brake when an accelerator lever is operated, and applies the brake when the accelerator lever is not operated. Specifically, when the accelerator lever is in a neutral position, the electromagnetic brake is brought into a braking state.

For the operation of the electromagnetic brake based on information that the accelerator lever is in neutral, there are two methods of "immediately operating the electromagnetic brake" and "operating the electromagnetic brake after a lapse of a predetermined time period."

The method of "immediately operating the electromagnetic brake" requires an electromagnetic brake which produces a large braking force in order to overcome an inertial force of the vehicle body. Thus increase in size and cost of the electromagnetic brake is inevitable. In the method of "operating the electromagnetic brake after a lapse of a predetermined time period," the brake is operated after the inertial force of the vehicle body is reduced, which results in reduction in size and cost of the electromagnetic brake.

The vehicle, however, travels some distance due to inertia before the brake is operated, resulting in a long braking distance. In this context, it is desired to shorten the braking distance and reduce the cost of the electromagnetic brake in the electric vehicle.

Further, Japanese Patent Laid-Open Publication No. SHO-57-17650 discloses an "Electric Wheelchair" and Japanese Patent Laid-Open Publication No. 48-4260 discloses a "Controller for Direction and Propulsion of Electric Vehicle."

The electric wheelchair of SHO-57-17650 includes left and right motors, left and right brake coils, left and right relays and left and right capacitors, being configured to control left and right driving wheels, respectively. More specifically, in the electric wheelchair, when an operating member is returned manually or automatically by the release of the control force to a neutral position, discharging of the left and right capacitors operates the left and right relays for a certain time, during which the motors are dynamically braked by use of resistors. When the operation of the left and right relays finishes in, e.g.,one minute, the mechanical brakes of the left and right brake coils work in addition to the dynamic brakes, stopping left and right drive shafts.

The above electric wheelchair, however, has the following problems (1) and (2).

(1) The left drive shaft is stopped by means of elements of the left capacitor, left relay, left resistor and left brake coil. The right drive shaft is stopped by means of elements of the right capacitor, right relay, right resistor and right brake coil. Between the left and right capacitors, left and right relays, and left and right brake coils, operational time differences exist, which are inevitable in electrical and mechanical operation. Further, between the left and right motors, an inevitable speed difference can exist. The accumulation thereof causes difference in stopping timing between the left drive shaft and the right drive shaft, resulting in the right or left turn of the electric wheelchair.

(2) In particular, when an operating element is turned to neutral during turning, the speed difference between the left and right motors results in an increased difference between the left and right stopping timings, substantially worsening riding comfort. Comfortable driving cannot thus be expected, and the countermeasure is required.

The same applies to the electric vehicle of SHO-48-4260.

SUMMARY OF THE INVENTION

According to the present invention, there is provided an electric vehicle which comprises: a directional speed member being able to instruct the forward travel, neutral state and reverse travel of the vehicle; an electric motor which rotates in forward and reverse directions in accordance with the operation of the directional speed member, for propelling the vehicle; a drive preparatory member which, when turned on, brings the electric motor into a drivable state, and when turned off, brings the electric motor into a drive stopped state; a braking device for applying the brake to the electric motor when the directional speed member is in neutral; and a controller for gradually reducing a drive control signal to the electric motor so as to reduce the rotational speed of the electric motor, and thereafter operating the braking device.

The control of gradually reducing the drive control signal to the electric motor to reduce the speed of the electric motor, and then operating the braking device provides speed-reducing performance similar to that of engine brake operation performed in a vehicle equipped with a reciprocal engine, sufficiently shortening the vehicle's stopping distances. The operation of the braking device after the speed reduction of the electric motor allows reduction in size and cost of the braking device.

The gradual reduction of the drive control signal is performed when, during vehicle travel, the drive preparatory member is turned off or the directional speed member is turned to a neutral state. The reduction of the drive control signal is preferably performed by repeatedly subjecting a drive control signal of the electric motor to a predetermined subtraction.

The electric vehicle of this invention preferably further includes a pair of left and right electric motors and a pair of left and right braking devices. In this case, the controller reduces the speeds of the pair of left and right electric motors, respectively, when, during vehicle travel, the drive preparatory member is turned off or the directional speed member is turned to a neutral state, and simultaneously operates the pair of left and right braking devices when the rotational speed of either of the electric motors is reduced to a rotational speed threshold. The rotational speed threshold is set at a sufficiently small rotational speed with the capacity of the braking devices taken into account, to avoid shock in sudden braking. When the motor rotational speed is reduced below the rotational speed threshold, the left and right braking devices are simultaneously operated. Left and right brake timings thus agree to one another, preventing the vehicle from turning right or left. Since both the left and right driving wheels are reduced in speed to sufficiently small rotational speeds by regenerative brake circuits or the like, little sudden brake shock occurs. Even when there is a substantial difference in rotational speed between the left and right driving wheels during vehicle turn, the present invention simultaneously operates the left and right brakes, preventing the vehicle from turning right or left.

Further, in the present invention, the controller may reduce left and right drive control signals for controlling the drive of the pair of left and right electric motors when, during vehicle travel, the drive preparatory member is turned of for the directional speed member is turned to a neutral state, and simultaneously operate the pair of left and right braking devices when either of the drive control signals is reduced to a drive control signal threshold. The drive control signal threshold is set at a sufficiently small signal output with the capacity of the braking devices taken into account, to avoid shock in sudden braking. When the drive control signal is reduced below the control signal threshold, the pair of left and right braking devices are operated. Left and right brake timings thus agree to one another, preventing the vehicle from turning right or left. Since both the left and right driving wheels are reduced in speed to sufficiently small rotational speeds by regenerative brake circuits or the like, little sudden brake shock occurs.

The controller of this invention reduces the speeds of the left and right electric motors when, during vehicle travel, the drive preparatory member is turned off or the directional speed member is turned to a neutral state and a speed difference between the rotational speeds of the left and right electric motors is within a speed difference threshold, and simultaneously operates the pair of left and right braking devices when the rotational speed of at least one of the electric motors is reduced to a rotational speed threshold. The controller also determines the ratio between the rotational speed of the left electric motor and the rotational speed of the right electric motor when the speed difference in rotational speed between the left and right electric motors exceeds the speed difference threshold, and reduces the speeds of the left and right electric motors, respectively, by left and right drive control signals according to the ratio, and simultaneously operates the left and right braking device when at least one of the rotational speeds is reduced to the rotational speed threshold.

The rotational speed threshold is preferably set at a sufficiently small rotational speed with the capacity of the braking devices taken into account, to avoid shock in sudden braking.

When the speed difference between the rotational speeds of the left and right electric motors is within the speed difference threshold, the left and right electric motors are reduced in speed, respectively. When at least one of the rotational speeds is reduced to the rotational speed threshold, the left and right braking means are simultaneously operated. Since the speed difference between the left and right rotational speeds is small, the reduction in speed of the left and right electric motors at substantially the same rate allows agreement between left and right brake timings.

When the speed difference between the rotational speeds of the left and right electric motors exceeds the speed difference threshold, the left and right electric motors are reduced in speed in accordance with the ratio between the rotational speed of the left electric motor and the rotational speed of the right electric motor. When at least one of the rotational speeds is reduced to the rotational speed threshold, the left and right braking means are simultaneously operated. The reduction in speed of the left and right electric motors in accordance with the ratio between the left and right rotational speeds brings agreement in left and right brake timings.

As described above, the rotational speeds of the left and right electric motors are reduced, respectively, with the speed difference taken into account, to the rotational speed threshold at which the left and right braking devices are simultaneously operated. Left and right brake timings thus agree to one another, preventing the vehicle from turning right or left. The left and right driving wheels are reduced in speed to sufficiently small rotational speeds by regenerative brake circuits or the like, resulting in little sudden brake shock.

BRIEF DESCRIPTION OF THE DRAWINGS

Preferred embodiments of the present invention will be described in detail below, by way of example only, with reference to the accompanying drawings, in which:

FIGS. 9A and 9B are flowcharts of brake control according to a fourth embodiment of the present invention.

DETAILED DESCRIPTION OF THE PREFERRED EMBODIMENTS

Figure 1:
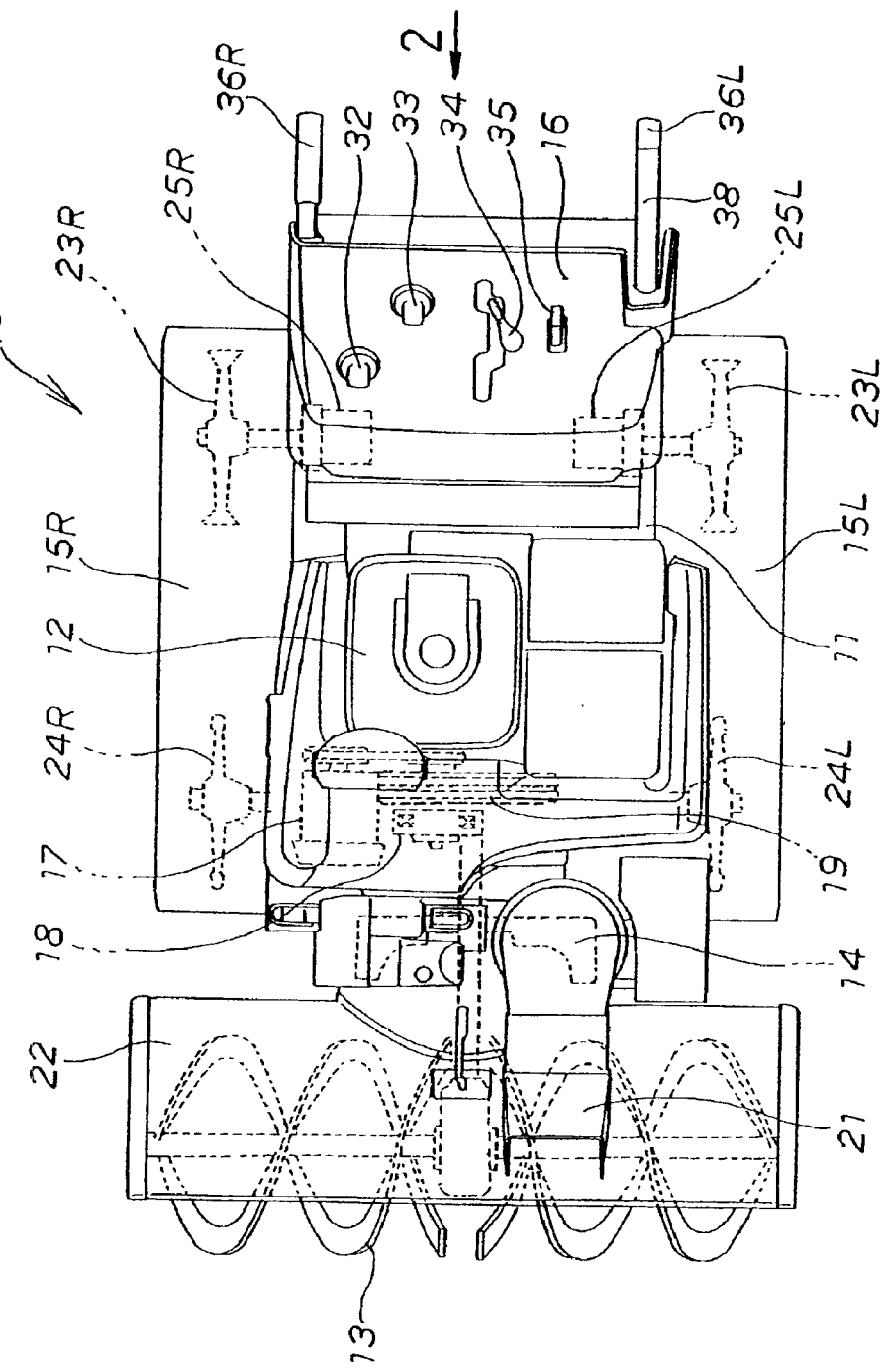
FIG. 1 is a plan view of a snow removal machine having a single engine and two electric motors, exemplifying an electric vehicle of the present invention.

Initial reference is made to FIG. 1 illustrating a snow removal machine 10 as a working machine exemplifying an electric vehicle of the present invention. The snow removal machine 10 includes an engine 12 mounted on a machine body 11. The snow removal machine 10 further includes a working section consisting of an auger 13 and a blower 14 provided at the front of the machine body 11, crawlers 15L and 15R provided at the left and right of the machine body 11, and a control panel 16 provided at the rear of the machine body 11. The snow removal machine 10 is a walk-behind working machine to be led by an operator walking behind the control panel 16.

The engine 12 drives a generator 17 for rotation and drives the auger 13 and the blower 14 for rotation via an electromagnetic clutch 18 and a belt 19.

Electric power produced by the generator 17 is supplied to left and right electric motors 25L and 25R for driving left and right driving wheels 23L and 23R via a battery 43 (See FIG. 4) arranged below the control panel 16.

The auger 13 collects snow accumulating on the ground to the center of the snow removal machine 10. The blower 14 throws the snow collected by the auger 13 outside of the machine via a shooter 21. The auger 13 is covered by an auger housing 22.

The left crawler 15L is wound around and extended between the left driving wheel 23L and a left driven wheel 24L. In this embodiment, the left driving wheel 23L is rotated in forward and reverse directions by the left electric motor 25L. The right crawler 15R is wound around and extended between the right driving wheel 23R and a right driven wheel 24R. The right driving wheel 23R is rotated in forward and reverse directions by the right electric motor 25R.

In a conventional snow removal machine, a single engine (a gasoline engine or a diesel engine) drives both a working system (auger rotating system) and a driving system (crawler driving system). In this embodiment, the engine 12 drives the working system (auger rotating system), and the electric motors 25L and 25R drive the driving system (crawler driving system).

Electric motors are suitable for traveling speed control, turning control and forward and reverse travel switching control of the snow removal machine 10. A powerful internal combustion engine is suitable for powering the working system susceptible to rapid load change.

Figure 2:
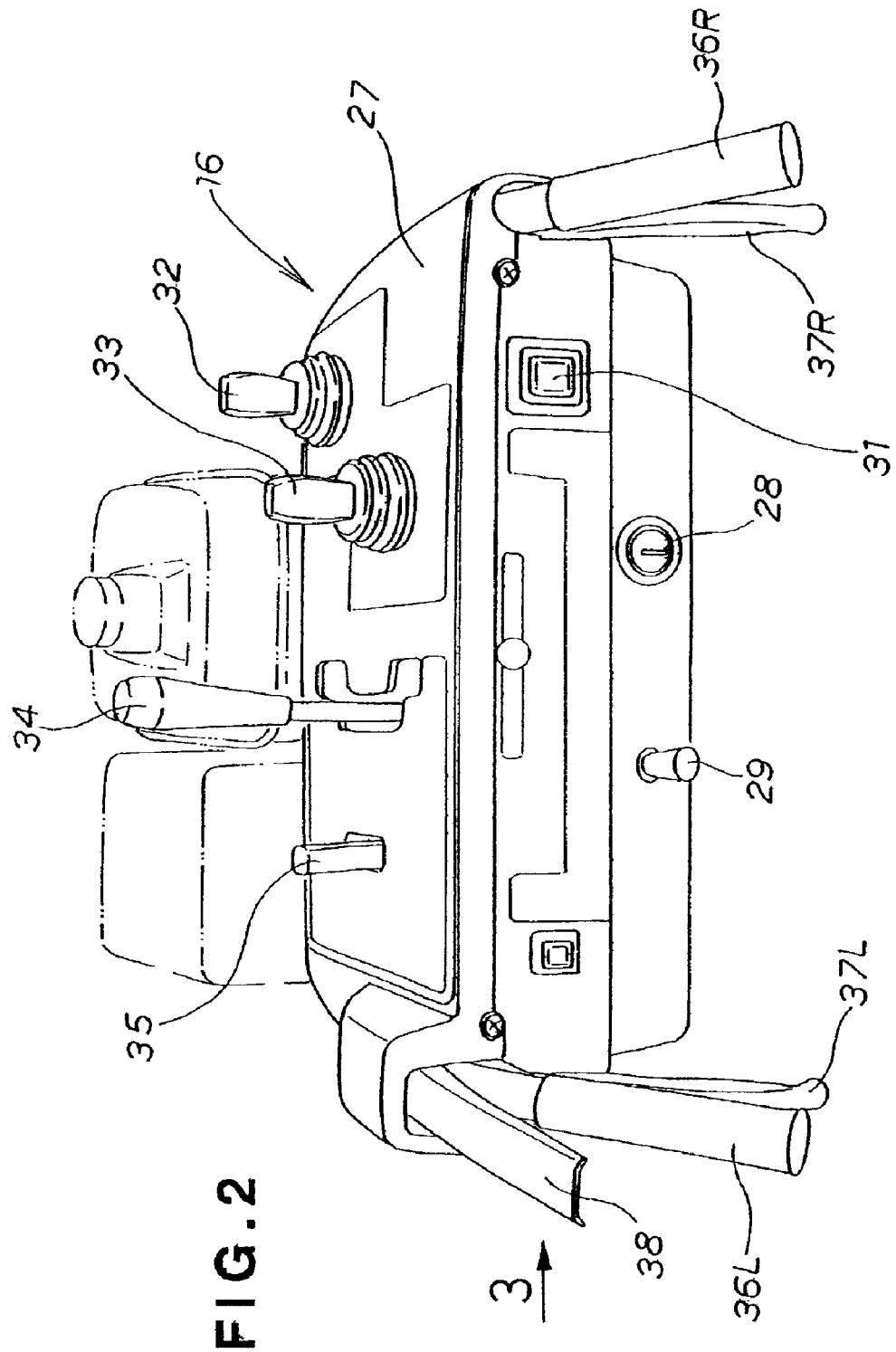
FIG. 2 is a view taken in the direction of arrow 2 in FIG. 1, illustrating a control section of the snow removal machine.

As shown in FIG. 2, the control panel 16 has, on the front surface of a control box 27 to face an operator, a main switch 28, an engine choke 29, a clutch control button 31 and other components. On the top surface of the control box 27, a snow throwing direction adjustment lever 32, an auger housing orientation adjustment lever 33, a directional speed lever 34 as a directional speed instructing member for the driving system, and an engine throttle lever 35 for the working system. On the right of the control box 27, a grip 36R and a right turn control lever 37R are provided. On the left of the control box 27, a grip 36L, a left turn control lever 37L and a drive preparatory lever 38 are provided.

The left and right turn control levers 37L and 37R are similar to brake levers, but cannot provide complete braking effects as will be described below. The left and right turn control levers 37L and 37R are used for reducing the rotational speed of one of the left and right electric motors 25L and 25R to turn the machine body. Therefore those components are not referred to as brake levers but turn control levers.

The main switch 28 is a known switch into which a main key is inserted and rotated for starting the engine. The engine choke 29 can be pulled to increase the density of air-fuel mixture. The snow throwing direction adjustment lever 32 is operated to change the direction of the shooter 21 (See FIG. 1). The auger housing orientation adjustment lever 33 is operated to change the orientation of the auger housing 22 (See FIG. 1).

Figure 3:
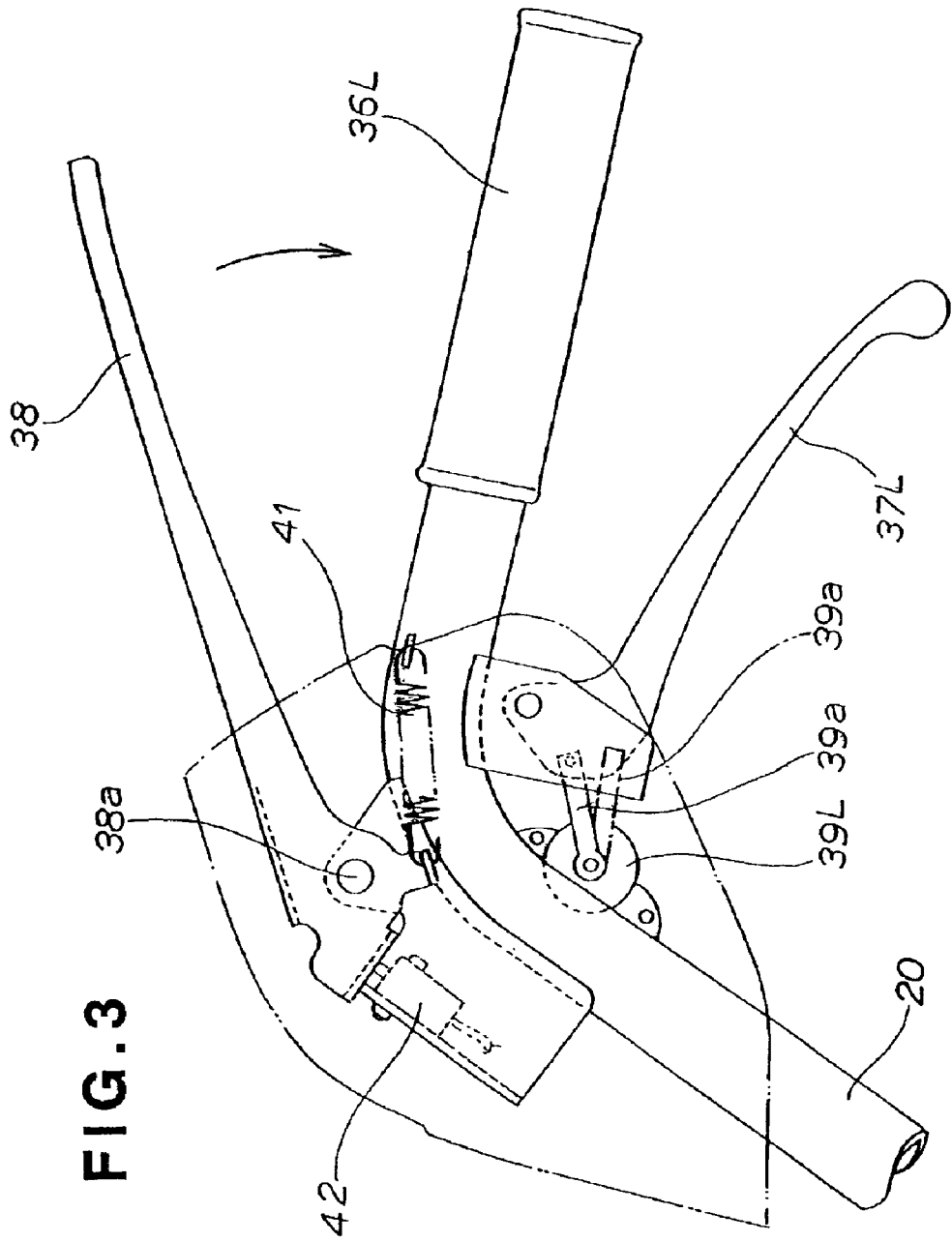
FIG. 3 is a view taken in the direction of arrow 3 in FIG. 2, illustrating a left turn control lever and a drive preparatory lever.

As shown in FIG. 3, handling the left turn control lever 37L can rotate an arm 39a of a potentiometer 39L at an angle to a position shown by imaginary lines. The potentiometer 39L produces electric information in accordance with the rotational position of the arm 39a.

The drive preparatory lever 38 is rotatable about a shaft 38a mounted to a handle 20 and is constantly biased by an extension spring 41 in a direction to turn a switch 42 off. Handling the drive preparatory lever 38 toward the left grip 36L by the left hand of the operator as shown by an arrow turns the switch 42 on. In short, handling the drive preparatory lever 38 turns the switch 42 from off to on. The produced ON signal is supplied to a controller 44 shown in FIG. 4. The controller 44 recognizes the completion of drive preparation upon receiving the ON signal.

Figure 4:
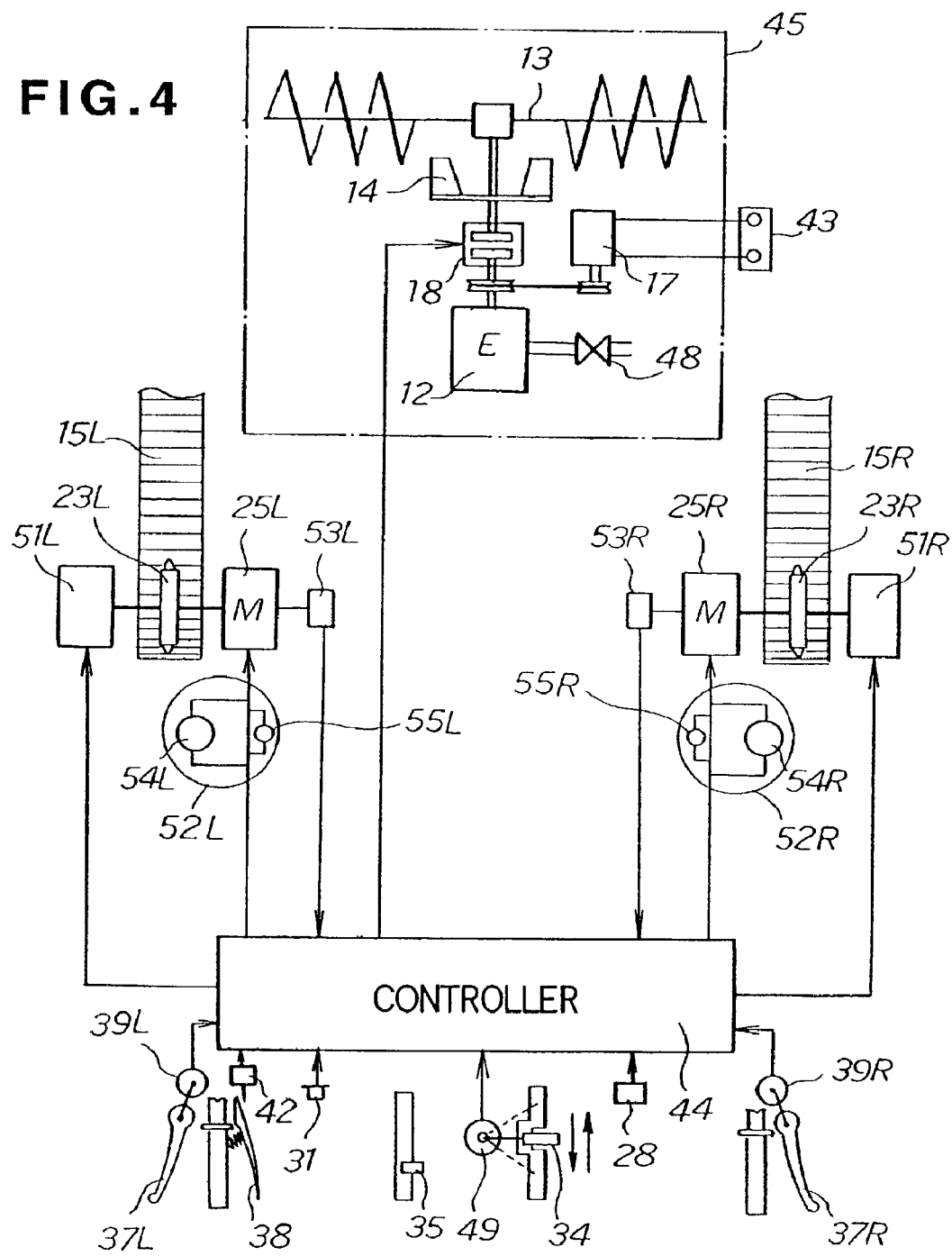
FIG. 4 is a control system diagram of the snow removal machine shown in FIG. 1.

FIG. 4 illustrates an electric system diagram of the snow removal machine according to the present invention. The controller 44 is provided in the control panel.

The engine 12 is started by the rotation of a starter not shown connected to the battery 43 when the main switch 28 is turned on. The engine 12 drives the generator 17 for rotation and the output power is supplied to the battery 43.

The engine throttle lever 35 is connected to a throttle valve 48 via a throttle wire (not shown). The engine throttle lever 35 is operated to adjust the opening of the throttle valve 48, adjusting the number of revolutions of the engine 12.

The drive preparatory lever 38 is handled to turn the switch 42 on. The ON signal is supplied to the controller 44. Handling the drive preparatory lever 38 allows the operation of the clutch control button 31. In this state, the clutch control button 31 is operated to bring the electromagnetic clutch 18 of the working system 45 into a connecting state, driving the blower 14 and the auger 13 for rotation. Either releasing the drive preparatory lever 38 or operating the clutch control button 31 for disconnection brings the electromagnetic clutch 18 into a disconnecting state.

The snow removal machine of this embodiment has left and right electromagnetic brakes 51L and 51R as brakes corresponding to parking brakes of a common vehicle. The electromagnetic brakes 51L and 51R are brought into a braking state when the directional speed lever 34 is put in a neutral region. When the main switch 28 is in an on state (start position) and the drive preparatory lever 38 is handled, in other words, when the two conditions are satisfied, switching the directional speed lever 34 to a forward position or a reverse position brings the electromagnetic brakes 51L and 51R into a released state (non-braking state), propelling the snow removal machine forward or backward.

Figure 5:
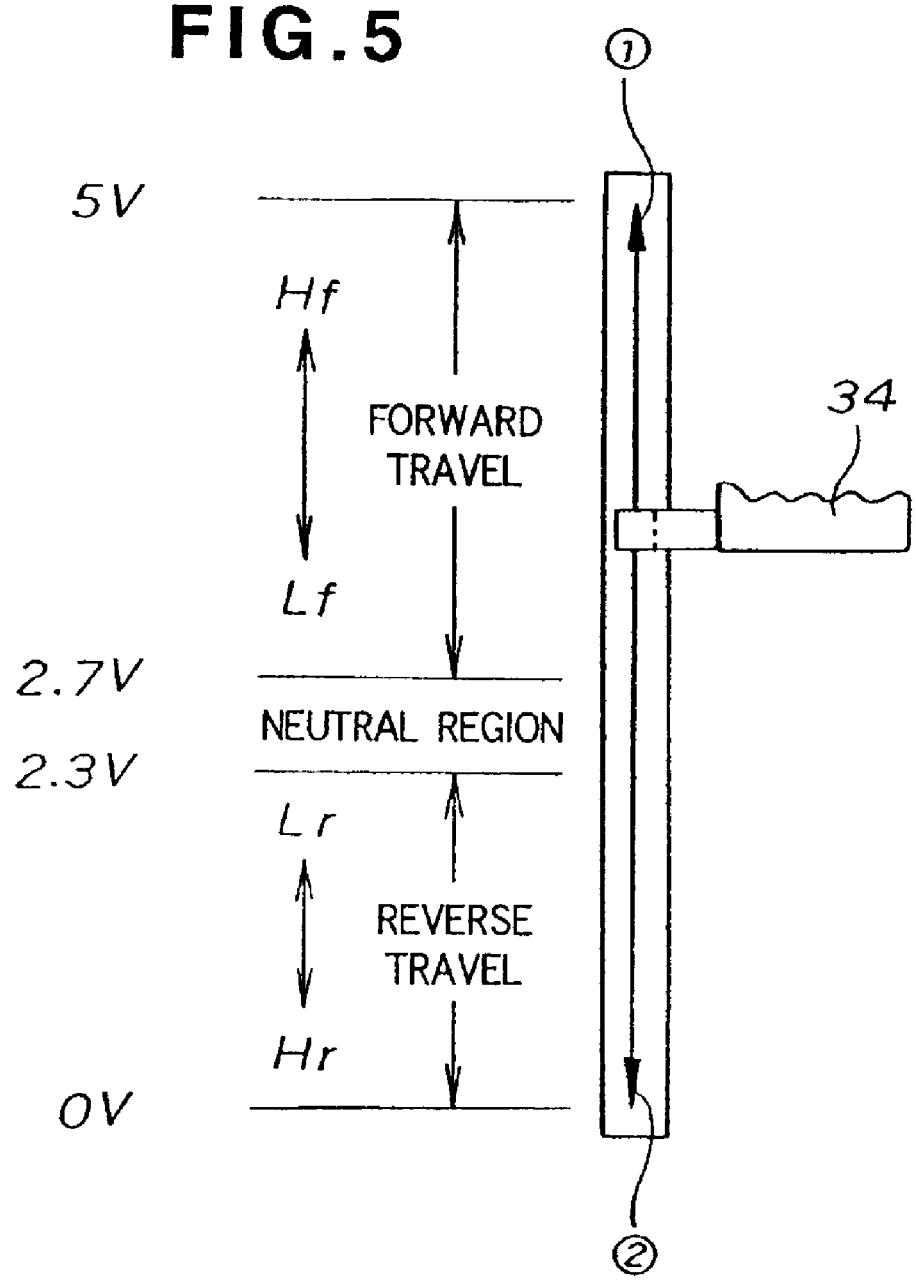
FIG. 5 is a diagram illustrating the operating range of a directional speed lever shown in FIG. 4.

The directional speed lever 34 is shown in detail in FIG. 5. From FIG. 5, the directional speed lever 34 is movable between a forward region, a neutral region and a reverse region. In the forward region, Lf indicates low-speed forward travel and Hf high-speed forward travel. The forward traveling speed is adjustable between Lf and Hf. The directional speed lever 34 is operated to adjust the number of revolutions of the left and right electric motors 25L and 25R via the controller 44 and left and right motor drivers 52L and 52R shown in FIG. 4. In the reverse region, Lr indicates low-speed reverse travel and Hr high-speed reverse travel. Reverse traveling speed is controllable between low-speed reverse travel Lr and high-speed reverse travel Hr.

A potentiometer 49 shown in FIG. 4 is designed to generate, as shown in FIG. 5, a voltage of 0 volt at the highest speed in reverse travel, a voltage of 5 volts at the highest speed in forward travel, and a voltage from 2.3 to 2.7 volts in the neutral region.

The controller 44 receives the position information of the directional speed lever 34 from the potentiometer 49 and controls the rotation direction and the rotational speed of the left and right electric motors 25L and 25R via the left and right motor drivers 52L and 52R. The rotational speeds of the left and right electric motors 25L and 25R are detected by rotation sensors 53L and 53R and the detection signals are fed back to the controller 44. Based on the detection signals, the controller 44 controls the rotational speeds of the electric motors 25L and 25R to a predetermined value. As a result, the left and right driving wheels 23L and 23R rotate in a desired direction at a predetermined speed, propelling the vehicle.

Braking of the vehicle in travel is performed through the following steps. The motor drivers 52L and 52R of this embodiment include regenerative brake circuits 54L and 54R. In this embodiment, electrical switching changes the electric motors 25L and 25R to generators for power generation. Generating voltage higher than the battery voltage enables storing electric energy in the battery 43. This is the operating principle of regenerative brakes.

The left potentiometer 39L detects the degree of handling of the left turn control lever 37L. In response to a signal detected by the left potentiometer 39L, the controller 44 activates the left regenerative brake circuit 54L and reduces the rotational speed of the left electric motor 25L.

The right potentiometer 39R detects the degree of handling of the right turn control lever 37R. In response to a signal detected by the right potentiometer 39R, the controller 44 activates the right regenerative brake circuit 54R and reduces the rotational speed of the right electric motor 25R.

The snow removal machine is thus turned left by handling the left turn control lever 37L and is turned right by handling the right turn control lever 37R.

Any of the following operations stops the travel of the snow removal machine.

i) Return the directional speed lever 34 to the neutral position.

ii) Release the drive preparatory lever 38.

iii) Return the main switch 28 to the off position.

Short-circuiting brake circuits 55L and 55R are used for the stopping. The left short-circuiting brake circuit 55L short-circuits the two poles of the electric motor 25L. The short circuit brings the electric motor into a suddenly braked state. The right short-circuiting brake circuit 55R operates the same.

Returning the main switch 28 to the off position after the snow removal machine stops traveling activates the electromagnetic brakes 51L and 51R to apply the parking brakes.

Figure 6:
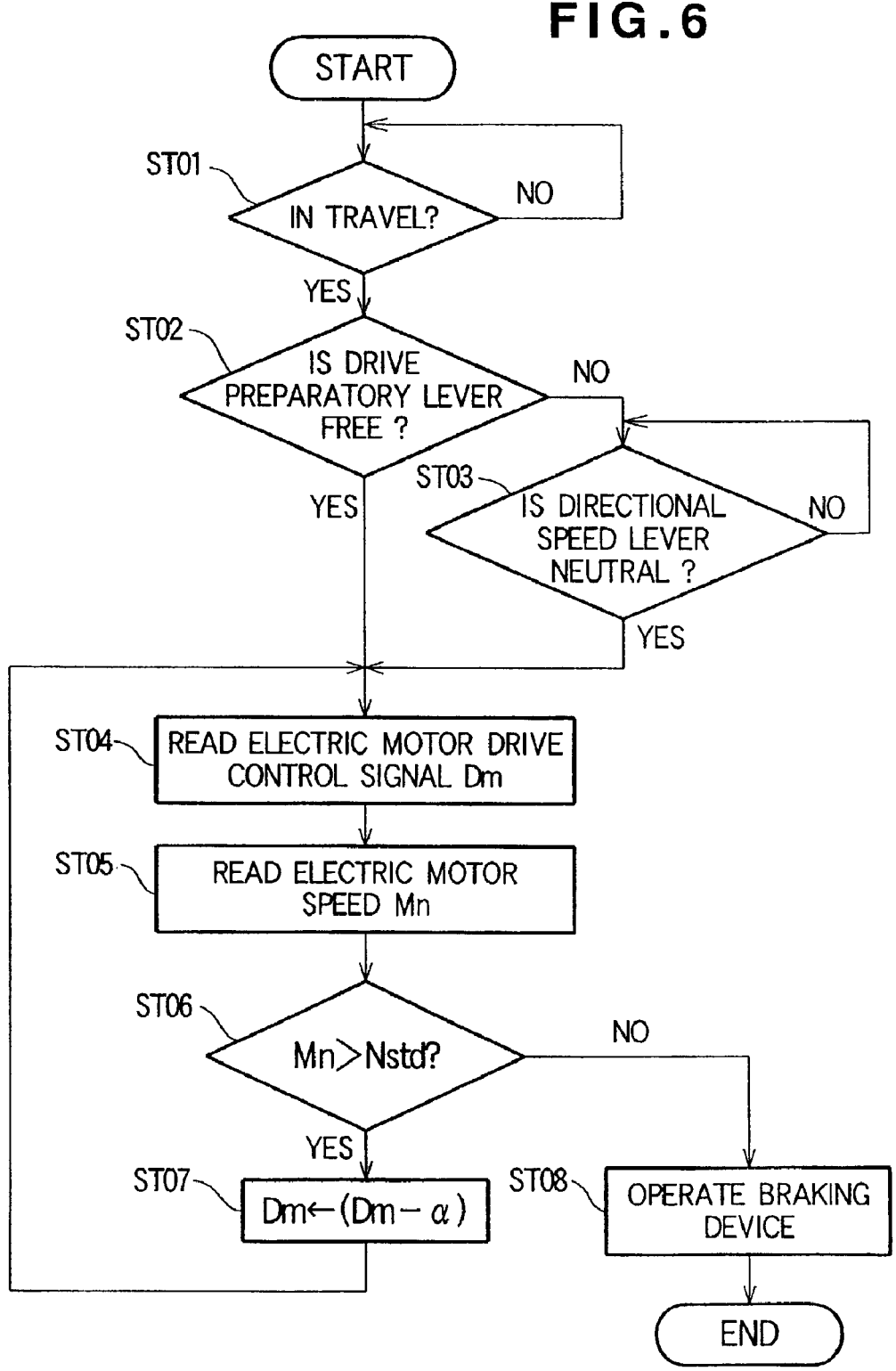
FIG. 6 is a flowchart of brake control according to a first embodiment of the present invention.

Now, a control method of stopping the snow removal machine in travel according to a first embodiment of the present invention will be described with reference to the flowchart shown in FIG. 6.

Step (hereinafter abbreviated as "ST") 01: Check whether or not the snow removal machine is in travel. For example, whether the snow removal machine is in travel or not can be determined by the presence or absence of detection signals of the rotation sensors 53L and 53R shown in FIG. 4. When in travel, proceed to ST02.

ST02: Check whether or not the drive preparatory lever 38 shown in FIG. 4 is in a free state. When the drive preparatory lever 38 is free, the switch 42 shown in FIG. 4 is off. When the drive preparatory lever 38 is handled, the switch 42 is turned on. When the answer is NO, proceed to ST03. When YES, proceed to ST04.

ST03: Check whether or not the directional speed lever 34 shown in FIG. 5 is in a neutral state. When YES, proceed to ST04.

ST04: With the above conditions, i.e., drive stopping conditions satisfied, read a drive control signal Dm to the electric motors.

ST05: Further, read an electric motor speed Mn. The reading of the electric motor speed is performed by detecting the number of revolutions of the electric motors by the rotation sensors 53L and 53R shown in FIG. 4.

ST06: Determine whether or not the electric motor speed Mn read in ST05 exceeds a threshold Nstd. For the threshold, a value determined by the rotational speed of the electric motors with which the braking devices including the short-circuiting brake circuits 55L and 55R shown in FIG. 4 become operable is used. Switching elements not shown are used in the short-circuiting brake circuit 55L and 55R. The switching elements preferably have a capacity corresponding to the braking force because electrical load is applied thereto in short-circuiting. In other words, the threshold depends on the selection of the switching elements provided in the short-circuiting brake circuits 55L and 55R. The threshold is desirably set at some 5% to some 10% of the maximum number of revolutions of the electric motors 25L and 25R. This allows reduction in capacity of the switching elements and thus reduction in size and cost of the short-circuiting brake circuits 55L and 55R.

ST07: When the answer is YES in ST06, a value resulting from the subtraction of $\alpha$ (e.g., 1.0%) from the drive control signal Dm is used as a new drive control signal Dm. The above ST04 to ST07 are repeated to gradually reduce the drive control signal Dm, reducing the rotational speed of the electric motors accordingly.

ST08: When the answer is NO in ST06, that is, the electric motor speed Mn is equal to or lower than the threshold, the braking devices (short-circuiting brake circuits 55L and 55R shown in FIG. 4) are operated to apply the brakes to the electric motors.

In summary, the controller of the electric vehicle in this embodiment repeatedly subjects a drive control signal of the electric motors to a predetermined subtraction (ST07) when the drive preparatory member is turned off (determined in ST02) or the directional speed member becomes neutral (determined in ST03) during vehicle travel, thereby reducing the rotational speed of the electric motors until the operation of the braking devices becomes possible (determined in ST06).

The above speed-reducing control of the electric motors provides speed-reducing performance similar to that of engine brake control performed in a vehicle equipped with a reciprocal engine. The stopping distance can thus be shortened sufficiently. Since the braking devices are operated after the speed reduction, the braking devices can be reduced in size and cost.

Figure 7:
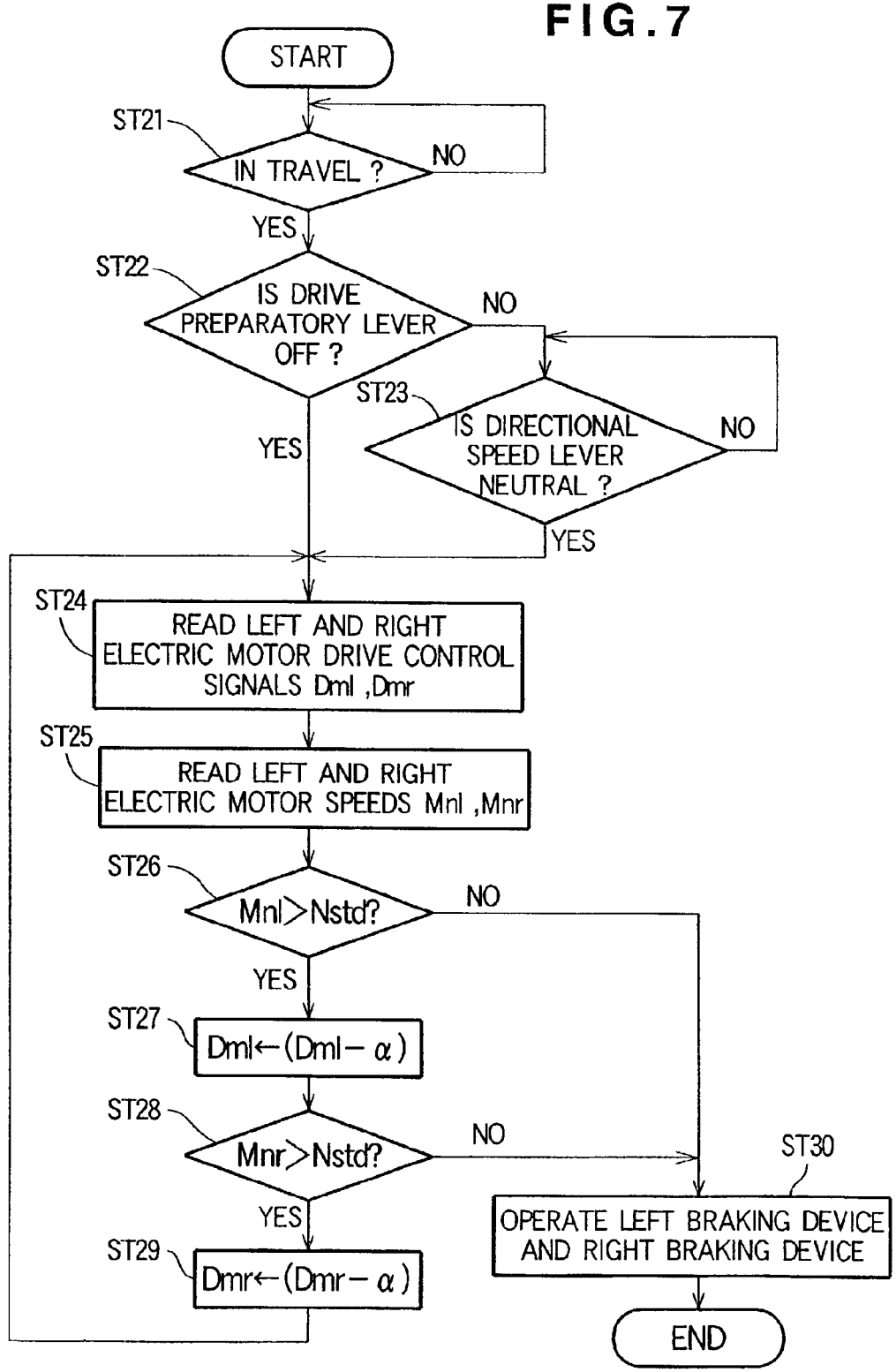
FIG. 7 is a flowchart of brake control according to a second embodiment of the present invention.

Now, a control method of stopping the snow removal machine in travel according to a second embodiment of this invention will be described with reference to the flowchart shown in FIG. 7.

ST21: Check whether or not the snow removal machine is in travel. For example, whether the machine is in travel or not can be checked by the presence or absence of detection signals of the rotation sensors 53L and 53R shown in FIG. 4. When in travel, proceed to ST22.

ST22: Determine whether or not the drive preparatory lever 38 shown in FIG. 4 is in a free (off) state. When the drive preparatory lever 38 is free, the switch 42 shown in FIG. 4 is off. When the drive preparatory lever 38 is handled, the switch 42 is turned on. When the answer is NO, proceed to ST23. When YES, proceed to ST24.

ST23: Check whether or not the directional speed lever 34 shown in FIG. 5 is in a neutral state. When the answer is YES, proceed to ST24.

ST24: When the above conditions are satisfied, that is, the drive preparatory lever 38 is free or the directional speed lever 34 is in a neutral state, which are drive stopping conditions, read drive control signals Dml and Dmr to the left and right electric motors 25L and 25R shown in FIG. 4. The drive control signals Dml and Dmr are PI drive control signals when having been subjected to PI (proportional-plus-integral) processing in the controller 44 and are PID drive control signals when having been subjected to PID (proportional-plus-integral-plus-derivative) processing.

ST25: Read left and right electric motor speeds Mnl and Mnr. The reading of the speeds are performed by detecting the numbers of revolutions of the electric motors 25L and 25R by the left and right rotation sensors 53L and 53R shown in FIG. 4.

ST26: Determine whether or not the left electric motor speed Mnl read in ST25 exceeds a rotational speed threshold Nstd. The threshold Nstd is equal to the value described with reference to FIG. 6. Switching elements are used in the short-circuiting brake circuits 55L and 55R as described with reference to FIG. 6.

ST27: When the answer is YES in ST26, a value resulting from the subtraction of α (e.g., 1.0%) from the drive control signal Dml is used as a new drive control signal Dml.

ST28: Determine whether or not the right electric motor speed Mnr exceeds the rotational speed threshold Nstd.

ST29: When the answer is YES in ST28, a value resulting from the subtraction of α (e.g., 1.0%) from the drive control signal Dmr is used as a new drive control signal Dmr. The above ST24 to ST29 are repeated to gradually reduce the left and right electric motor drive control signals Dml and Dmr, reducing the rotational speeds of the electric motors accordingly.

ST30: When the answer is NO in ST26, that is, the rotational speed of the left electric motor is equal to or lower than the threshold, or the answer is NO in ST28, that is, the rotational speed of the right electric motor is equal to or lower than the threshold, the left and right braking devices 55L and 55R shown in FIG. 4 are simultaneously operated to apply the brakes. This stops the electric vehicle.

In common sense, the left and right braking devices should not be simultaneously operated until the rotational speeds of both the motors are equal to or lower than the threshold. In this embodiment, the left and right braking devices are simultaneously operated when the rotational speed of either of the motors is equal to or lower than the threshold. The reason is as follows.

The electric vehicle illustrated in this embodiment mainly works linearly and is assumed to be slowly turned for directional correction. Thus the difference in the number of revolutions of the left and right electric motors produced during turning is not so great. Therefore the simultaneous operation of the left and right braking devices with the rotational speed of either of the motors equal to or lower than the threshold would not cause shock.

In summary, the present invention provides an electric vehicle comprising a drive preparatory member (reference numeral 38 in FIG. 4) which enables driving when turned on and generates a stop instruction when turned off, a directional speed member (reference numeral 34 in FIG. 4) which can specify forward travel, neutral and reverse travel, a pair of left and right electric motors (reference numerals 25L and 25R in FIG. 4) which rotate in forward and reverse directions in accordance with the operation of the directional speed member for propelling the vehicle, and a pair of left and right braking devices (reference numeral 55L and 55R in FIG. 4) which can apply the brakes in neutral, the electric vehicle including a controller which performs brake control during vehicle travel (ST21 in FIG. 7), reducing the speeds of the left and right electric motors (ST27 and ST29 in FIG. 7) when the drive preparatory member is turned off (ST22 in FIG. 7) or the directional speed member becomes neutral (ST23 in FIG. 7), and simultaneously operating the left and right braking devices (ST30 in FIG. 7) when either of the rotational speeds is reduced to a rotational speed threshold.

The rotational speed threshold is set, with the capacity of the braking devices taken into account, at a sufficiently small speed to avoid shock in sudden braking.

When either of the rotational speeds is lower than the rotational speed threshold, the left and right braking devices are simultaneously operated. Left and right brake timings thus agree to one another, preventing the right or left turn of the vehicle. The regenerative brake circuits or the like reduce the speeds of the left and right drive wheels to sufficiently small rotational speeds, causing little sudden brake shock.

Even when there is a substantial difference in rotational speed between the left and right driving wheels during turning, the present invention simultaneously operates the left and right brakes to prevent the left or right turn of the vehicle, maintaining good linearity.

Figure 8:
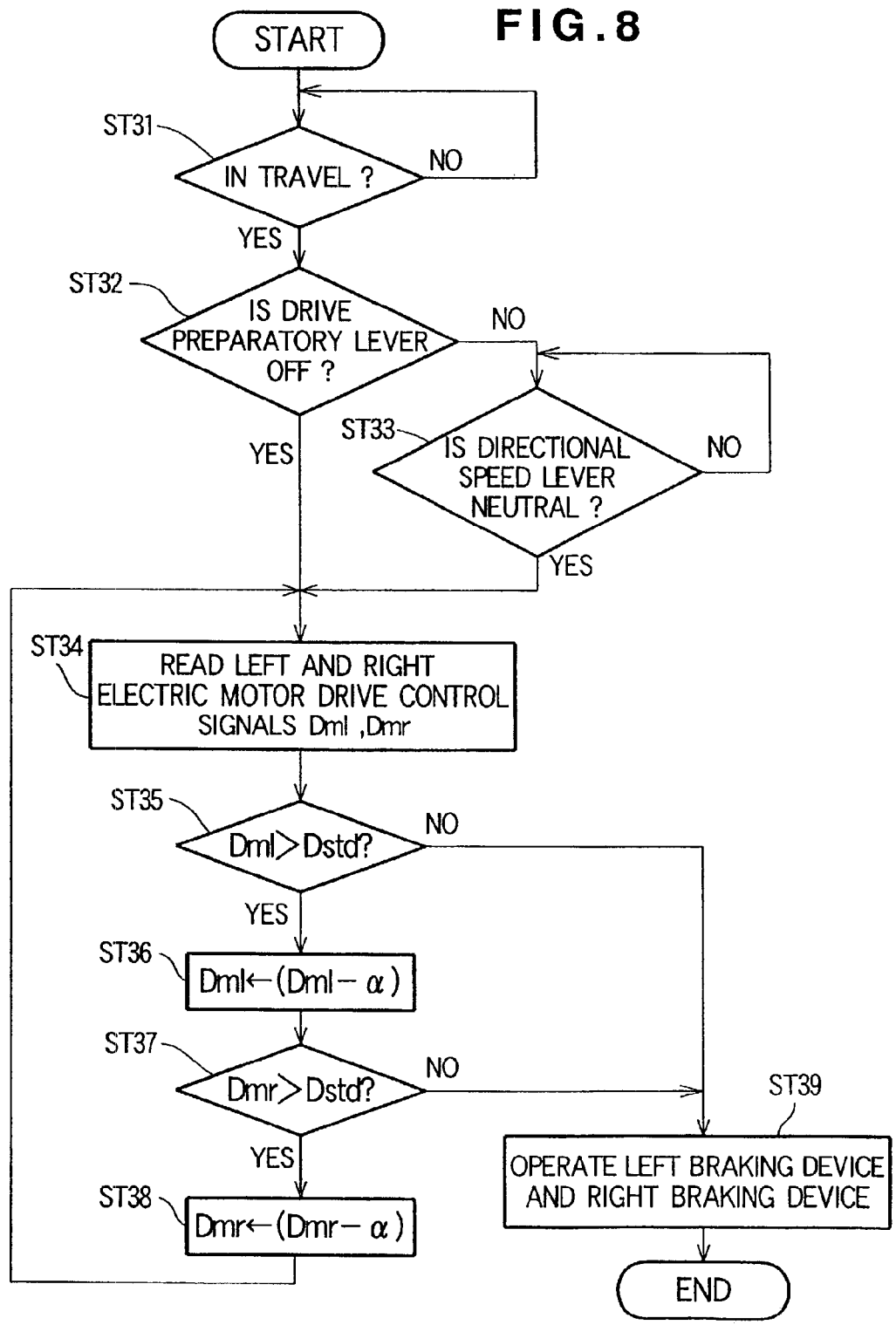
FIG. 8 is a flowchart of brake control according to a third embodiment of the present invention.

Now, a control method of stopping the snow removal machine in travel according to a third embodiment of the present invention will be described with reference to the flowchart shown in FIG. 8.

ST31: Check whether or not the snow removal machine is in travel. For example, it can be determined from the presence or absence of detection signals of the rotation sensors 53L and 53R in FIG. 4. When in travel, proceed to ST32.

ST32: Determine whether or not the drive preparatory lever 38 shown in FIG. 4 is in a free state (off state). When the answer is NO, proceed to ST33, and when YES, proceed to ST34.

ST33: Check whether or not the directional speed lever 34 shown in FIG. 5 is in a neutral state. When the answer is YES, proceed to ST34.

ST34: With the above conditions, that is, drive stopping conditions satisfied, read drive control signals Dml and Dmr to the left and right electric motors. The drive control signals Dml and Dmr are PI drive control signals when having been subjected to PI processing in the controller 44 shown in FIG. 4 and are PID drive control signals when having been subjected to PID processing.

ST35: Determine whether or not the left motor drive control signal Dml exceeds a drive control signal threshold Dst.

The threshold is desirably set at some 5% to some 10% of the maximum drive control signal. This allows reduction in size and cost of the short-circuiting brake circuit 55L of FIG. 4.

ST36: When the answer is YES in ST35, a value resulting from the subtraction of α (e.g., 1.0%) from the drive control signal Dml is used as a new drive control signal Dml.

ST37: Determine whether or not the right motor drive control signal Dmr exceeds the drive control signal threshold Dstd.

ST38: When the answer is YES in ST37, a value resulting from the subtraction of α (e.g, 1.0%) from the drive control signal Dmr is used as a new drive control signal Dmr. The above ST34 to ST38 are repeated to gradually reduce the drive control signals Dml and Dmr, reducing the rotational speeds of the left and right electric motors, accordingly.

ST39: When the answer is NO in ST35, that is, the left motor drive control signal Dml is equal to or lower than the threshold Dstd, or the answer is NO in ST37, that is, the right motor drive control signal Dmr is equal to or lower than the threshold Dstd, the left and right braking devices 55L and 55R shown in FIG. 4 are simultaneously operated to apply the brakes. This stops the electric vehicle.

In common sense, the left and right braking devices should not be simultaneously operated until the drive control signals to both the left and right motors are equal to or lower than the threshold. In this embodiment, the left and right braking devices are simultaneously operated when the drive control signal to either of the motors is equal to or lower than the threshold. The reason is as follows.

The electric vehicle illustrated in this embodiment mainly works linearly and is assumed to be slowly turned for directional correction. Thus the difference between the drive control signals to the left and right electric motors generated by the controller during turning is not so great. Therefore the simultaneous operation of the left and right braking devices with the drive control signal to either of the motors equal to or lower than the threshold would not cause shock.

In summary, the present invention provides an electric vehicle comprising a drive preparatory member (reference numeral 38 in FIG. 4) which enables driving when turned on and generates a stop instruction when turned off, a directional speed member (reference numeral 34 in FIG. 4) which can specify forward travel, neutral and reverse travel, a pair of left and right electric motors (reference numerals 25L and 25R in FIG. 4) which rotate in forward and reverse directions in accordance with the operation of the directional speed member for propelling the vehicle, and a pair of left and right braking devices (reference numeral 55L and 55R in FIG. 4) which can apply the brakes in neutral, the electric vehicle including a controller which performs brake control during vehicle travel (ST31 in FIG. 8), gradually reducing left and right drive control signals to control the left and right electric motors (ST36 and ST38 in FIG. 8) when the drive preparatory member is in a free state (ST32 in FIG. 8) or the directional speed member becomes neutral (ST33 in FIG. 8), and simultaneously operating the left and right braking devices (ST39 in FIG. 8) when either of the drive control signals is reduced to a drive control signal threshold.

Now, a control method of stopping a snow removal machine in travel according to a fourth embodiment of the present invention will be described with reference to the flowcharts shown in FIGS. 9A and 9B.

ST41: Check whether or not the snow removal machine is in travel. For example, whether the machine is in travel or not can be determined from the presence or absence of detection signals of the rotation sensors 53L and 53R shown in FIG. 4. When in travel, proceed to ST42.

ST42: Determine whether or not the drive preparatory lever 38 shown in FIG. 4 is in a free state (off state). When the answer is NO, proceed to ST43, and when YES, proceed to ST44.

ST43: Check whether or not the directional speed lever 34 shown in FIG. 5 is in a neutral state. When the answer is YES, proceed to ST44.

ST44: When the drive preparatory lever 38 is in a free state or the directional speed lever 34 is in a neutral state, read left electric motor rotational speed Mnl and a right electric rotational speed Mnr. The reading of the left and right electric motor rotational speeds Mnl and Mnr is performed by detecting the actual rotation of the electric motors 25L and 25R by the rotation sensors 53L and 53R shown in FIG. 4.

ST45: Determine a speed difference ΔMn between the left electric motor rotational speed Mnl and the right electric motor rotational speed Mnr. The speed difference ΔMn is an absolute value.

ST46: Determine whether or not the speed difference ΔMn is equal to or lower than a speed difference threshold ΔMstd. When the answer is YES, proceed to ST47. When NO, with the speed difference ΔMn exceeding the speed difference threshold ΔMstd, proceed to ST53 in FIG. 9B.

The speed difference threshold ΔMstd is preferably set at some 100 rpm.

ST47: Read drive control signals Dml and Dmr to the left and right electric motors. The left and right drive control signals Dml and Dmr are basically equal to one another. The drive control signals Dml and Dmr are PI drive control signals when having been subjected to PI processing and are PID drive control signals when having been subjected to PID processing.

ST48: Determine whether or not the left electric motor speed Mnl exceeds a rotational speed threshold Nstd.

The rotational speed threshold Nstd is determined with consideration given to the rotational speeds of the electric motors with which the braking devices including the short-circuiting brake circuits 55L and 55R shown in FIG. 4 become operable. Switching elements not shown are used for the short-circuiting brake circuits 55L and 55R as in the above-described embodiment. The switching elements have capacity corresponding to the brake capacity because electrical load is applied thereto at short-circuiting. The rotational speed threshold Nstd is desirably set at some 5% to some 10% of the maximum number of revolutions of the electric motors 25L and 25R. This allows reduction in capacity of the switching elements and thus reduction in size and cost of the short-circuiting brake circuits 55L and 55R.

ST49: When the answer is YES at ST48, a value resulting from the subtraction of α (e.g., 1.0%) from the left drive control signal Dml is used as a new left drive control signal Dml.

ST50: Determine whether or not the right electric motor speed Mnr exceeds the rotational speed threshold Nstd.

ST51: When the answer is YES in ST50, a value resulting from the subtraction of α (e.g., 1.0%) from the right drive control signal Dmr is used as a new right drive control signal Dmr.

The above ST47, ST48, ST49, ST50 and ST51 are repeated to gradually reduce the left and right drive control signals Dml and Dmr, reducing the left and right electric motor speeds Mnl and Mnr, accordingly.

ST52: When the answer is NO in ST48, that is, the left electric motor speed Mnl is lower than the rotational speed threshold Nstd (reduced below Nstd), or the answer is NO in ST50, that is, the right electric motor speed Mnr is lower than the rotational speed threshold Nstd (reduced below Nstd), the left and right braking devices 55L and 55R shown in FIG. 4 are simultaneously operated to apply the brakes. This stops the electric vehicle.

Figure 9B:
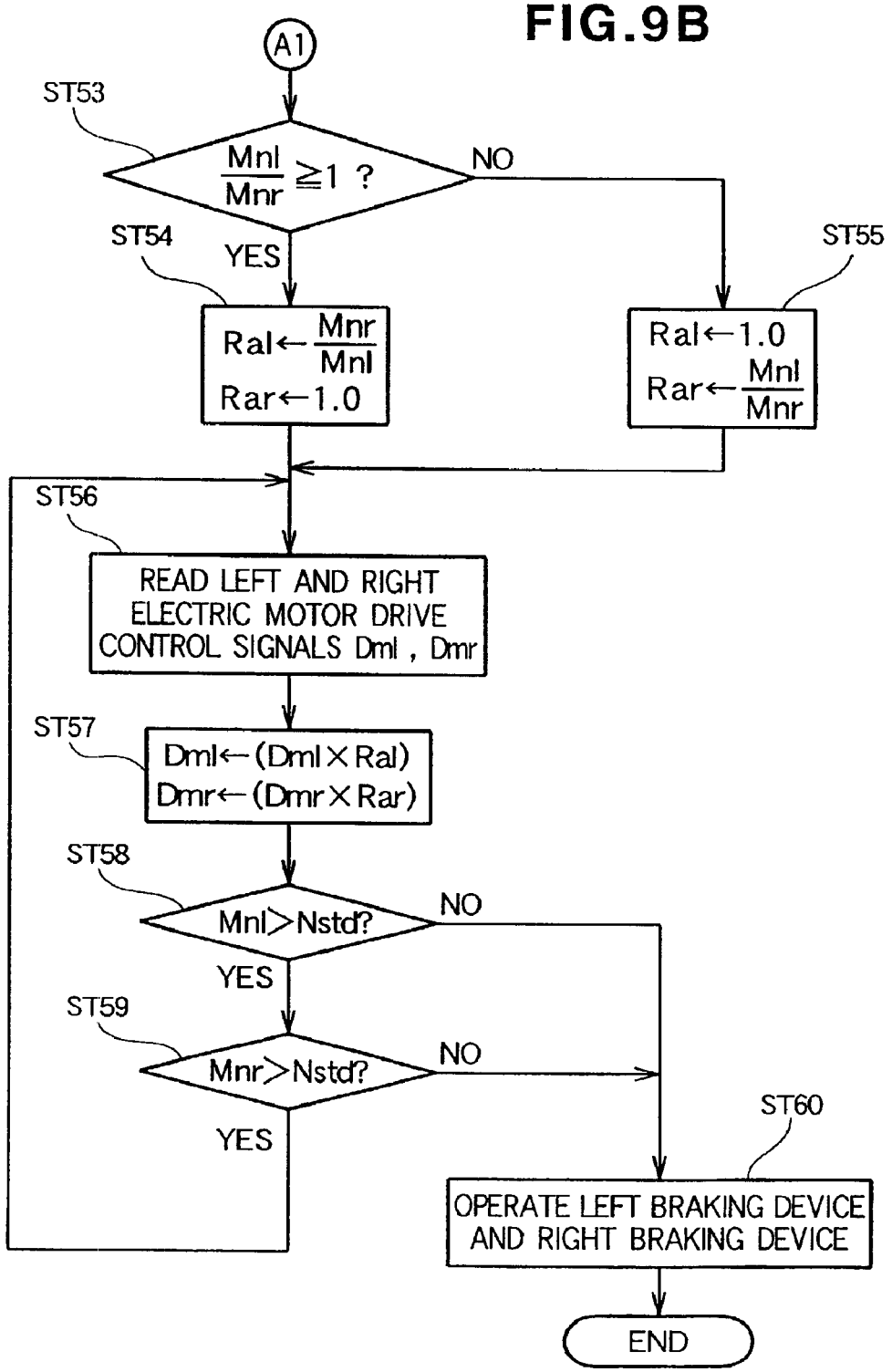

Now, with reference to FIG. 9B, the description will be continued. When the speed difference between the left and right electric motors is small in ST46 in FIG. 9A, there is little difference between them, so that the rotational speeds of both the electric motors are gradually reduced. When the rotational speed difference is large, it takes time to reduce the speed to a predetermined rotational speed, so that a drive control signal is multiplied by a predetermined correction factor to speedily reduce the rotational speed of the electric motors.

ST53: When the speed difference ΔMn exceeds the speed difference threshold ΔMstd in ST46, determine whether or not a value resulting from dividing the left electric motor speed Mnl by the right electric motor speed Mnr is equal to or greater than 1. Specifically, determine whether or not the left electric motor speed Mnl is greater than the right electric motor speed Mnr. When the answer is YES, proceed to ST54. When NO, proceed to ST55 because the value from the division is less than 1.

ST54: With the right electric motor speed Mnr as 1.0, the ratio of the left electric motor speed Mnl to the right electric motor speed Mnr is greater than 1.0. With that, the ratio of Mnr/Mnl which is less than 1.0 is used as a left correction factor Ral. A ratio of 1.0 is used as a right correction factor Rar. That is, the rotational speed of the left electric motor which is greater than the right rotational speed is reduced with the left correction factor Ral which is less than 1.0.

ST55: The value from the division is less than 1, that is, the right electric motor speed Mnr is greater than the left electric motor speed Mnl. In this state, with the left electric motor speed Mnl as 1.0, a ratio of Mnl/Mnr which is less than 1.0 is used as a right correction factor Rar, and 1.0 is used as a left correction factor. The ratio of Mnl/Mnr which is less than 1.0 is used for the right electric motor speed Mnr which is greater than the left electric motor speed Mnl, to reduce the number of revolutions of the right electric motor.

ST56: Read drive control signals Dml and Dmr to the left and right electric motors. The drive control signals Dml and Dmr are PI drive control signals when having been subjected to PI processing and are PID drive control signals when having been subjected to PID processing.

ST57: Multiply the left drive control signal Dml by the left correction factor Ral for correction. The result is used as a new left drive control signal Dml. Also multiply the right drive control signal Dmr by the right correction factor Rar for correction. The result is used as a new right drive control signal Dmr. Here, when in ST53, the answer is YES, the correction factors in ST54 are used, and when NO, the correction factors in ST55 are used for calculation.

ST58: Determine whether or not the left electric motor speed Mnl exceeds the rotational speed threshold Nstd. When the answer is YES, proceed to ST59.

ST59: Determine whether or not the right electric motor speed Mnr exceeds the rotational speed threshold Nstd.

The above ST56, ST57, ST58 and ST59 are repeated to gradually reduce the left and right drive control signals Dml and Dmr, reducing the left and right electric motor speeds Mnl and Mnr, accordingly.

ST60: When the answer is NO in ST58, that is, the left electric motor speed Mnl is reduced below the rotational speed threshold Nstd, or the answer is NO in ST59, that is, the right electric motor speed Mnr is reduced below the rotational speed threshold Nstd, the right and left braking devices 55L and 55R shown in FIG. 4 are simultaneously operated to apply the brakes. This stops the electric vehicle.

In common sense, the left and right braking devices should not be simultaneously operated until the rotational speeds of both the motors are equal to or lower than the rotational speed threshold Nstd. In this embodiment, the left and right braking devices are simultaneously operated when the rotational speed of either of the motors is equal to or lower than the rotational speed threshold Nstd. The reason is as follows.

The electric vehicle illustrated in this embodiment mainly works linearly and is assumed to be slowly turned for directional correction. Thus the difference in the number of revolutions between the left and right electric motors produced during turning is not so great. Therefore the simultaneous operation of the left and right braking devices with the rotational speed of either of the motors equal to or lower than the rotational speed threshold would not cause shock.

In summary, the present embodiment provides an electric vehicle comprising a drive preparatory member (reference numeral 38 in FIG. 4) which enables driving when turned on and generates a stop instruction when turned off, a directional speed member (reference numeral 34 in FIG. 4) which can specify forward travel, neutral and reverse travel, a pair of left and right electric motors (reference numerals 25L and 25R in FIG. 4) which rotate in forward and reverse directions in accordance with the operation of the directional speed member for propelling the vehicle, and a pair of left and right braking devices (reference numeral 55L and 55R in FIG. 4) which, during vehicle travel (ST41 in FIG. 9A), can apply the brakes when the drive preparatory member is turned off (ST42 in FIG. 9A) or the directional speed member is turned neutral (ST43 in FIG. 9A).

The electric vehicle includes a controller for controlling brake by reducing the speeds of the left and right electric motors by left and right substantially identical drive control signals (ST49 and ST51 in FIG. 9A) when the speed difference ΔMn of the rotational speeds of the left and right electric motors is within the speed difference threshold ΔMstd (ST46 in FIG. 9A), and simultaneously operating the left and right braking devices (ST52 in FIG. 9A) when at least one the rotational speeds is reduced to the rotational speed threshold Nstd (ST48 and ST50 in FIG. 9A).

The rotational speed threshold Nstd is set, with the capacity of the braking means taken into account, at a sufficiently small rotational speed to avoid shock in sudden braking.

When the speed difference ΔMn between the left and right electric motor rotational speeds is within the speed difference threshold ΔMstd, the left and right electric motors are reduced in speed, respectively. When at least one of the rotational speeds is reduced to the rotational speed threshold Nstd, the left and right braking devices are simultaneously operated. Since the speed difference ΔMn between the left and right rotational speeds is small, speed reduction of the left and right electric motors at substantially the same rate allows agreement between left and right braking timings.

When the speed difference ΔMn between the rotational speeds of the left and right electric motors exceeds the speed difference threshold ΔMstd (ST46 in FIG. 9A), the controller of this embodiment determines the ratio between the rotational speed of the left electric motor and the rotational speed of the right electric motor (ST53, ST54 and ST55 in FIG. 9B) and reduces the speeds of the left and right electric motors by the left and right drive control signals according to the ratio (ST57 in FIG. 9B). When at least one of the rotational speeds is reduced to the rotational speed threshold Nstd (ST58 and ST59 in FIG. 9B), the controller simultaneously operates the left and right braking devices (ST60 in FIG. 9B).

When the speed difference ΔMn between the rotational speeds of the left and right electric motors exceeds the speed difference threshold ΔMstd, the left and right electric motors are reduced in speed in accordance with the ratio between the rotational speed of the left electric motor and the rotational speed of the right electric motor. When at least one of the rotational speeds is reduced to the rotational speed threshold Nstd, the left and right braking devices are simultaneously operated. Since the left and right electric motors are reduced in speed in accordance with the ratio between the left and right rotational speeds, the left and right braking timings agree to one another.

In this manner, the rotational speeds of the left and right electric motors are reduced with the speed difference ΔMn taken into account. When at least one of the rotational speeds is reduced to the Nstd, the left and right braking devices are simultaneously operated. The left and right braking timings thus agree to one another, preventing right or left turn of the vehicle. Since both the left and right driving wheels are reduced in speed to sufficiently small rotational speeds by the regenerative brake circuits or the like, little sudden brake shock occurs.

Even when there is a substantial difference in rotational speed between the left and right driving wheels during turning, the left and right brakes are simultaneously operated, preventing the vehicle from turning right or left.

The electric vehicle of the present invention is not limited to the snow removal machine illustrated in the above embodiments, and may be of any kind as long as being an electric vehicle such as an electric carrier or an electric caddie cart.

The snow removal machine of the embodiments has left and right electric motors. An electric vehicle of this invention may be of a type having a single electric motor for driving left and right driving wheels.

The present embodiments have the single directional speed lever. Several directional speed levers may be provided to share the functions. The directional speed control member may be a lever, a dial, a switch or an equivalent.

The present disclosure relates to the subject matters of Japanese Patent Application No. 2001-340244, filed Nov. 6, 2001, No. 2001-341897, filed Nov. 7, 2001, No. 2001-362665, filed Nov. 28, 2001, No. 2002-074940, filed Mar. 18, 2002, No. 2002-074941, filed Mar. 18, 2002, and No. 2002-290516, filed Oct. 2, 2002, the disclosures of which are expressly incorporated herein by reference in their entireties.

What is claimed is:

1. An electric vehicle comprising:
a directional speed member operable to instruct the forward travel, neutral state and reverse travel of the vehicle;
at least one electric motor rotatable in forward and reverse directions in accordance with the operation of the directional speed member for propelling said vehicle;
a drive preparatory member which, when turned on, brings the at least one electric motor into a drivable state, and when turned off, brings the at least one electric motor into a drive stopped state;
at least one braking device for applying a braking force to the at least one electric motor when the directional speed member is in neutral, the at least one braking device comprising an electric short-circuiting brake circuit cooperating with the at least one electric motor to short-circuit two poles of the at least one electric motor to bring the at least one electric motor into a suddenly brake state; and
a controller for gradually reducing a drive control signal to the at least one electric motor so as to reduce the rotational speed of the at least one electric motor, and thereafter operating the at least one braking device, wherein the controller repeatedly subjects the drive control signal of the at least one electric motor to a predetermined subtraction when, during vehicle travel, the drive preparatory member is turned off or the directional speed member is turned to the neutral state, thereby reducing the speed of the at least one electric motor until the at least one braking device becomes operable, and wherein the controller reads a current drive control signal to the at least one electric motor, compares the current drive control signal with a threshold that is determined by a rotational speed of the at least one electric motor with which the at least one braking device comprising the electric short-circuiting brake circuit becomes operable, and, when the current drive control signal exceeds the threshold, uses a value resulting from the subtraction with a given ratio from the current drive control signal as a new drive control signal to the at least one electric motor.

2. An electric vehicle as set forth in claim 1; wherein the vehicle comprises a pair of left and right electric motors and a pair of left and right braking devices and the controller reduces the speeds of the pair of left and right electric motors, respectively, when, during vehicle travel, the drive preparatory member is turned off or the directional speed member is turned to a neutral state, and simultaneously operates the pair of left and right braking devices when the rotational speed of at least one of the electric motors is reduced to a rotational speed threshold.

3. An electric vehicle as set forth in claim 1; wherein the vehicle comprises a pair of left and right electric motors and a pair of left and right braking devices and the controller reduces left and right drive control signals for controlling the drive of the pair of left and right electric motors when, during vehicle travel, the drive preparatory member is turned off or the directional speed member is turned to a neutral state, and simultaneously operates the pair of left and right braking devices when either of the drive control signals is reduced to a drive control signal threshold.

4. An electric vehicle as set forth in claim 1; wherein the vehicle comprises a pair of left and right electric motors and a pair of left and right braking devices and the controller reduces the speeds of the pair of left and right electric motors when, during vehicle travel, the drive preparatory member is turned off or the directional speed member in turned to a neutral state, and a speed difference between the rotational speeds of the left and right electric motors is within a speed difference threshold, and simultaneously operates the pair of left and right braking devices when the rotational speed of at least one of the electric motors is reduced to a rotational speed threshold and the controller determines the ratio between the rotational speed of the left electric motor and the rotational speed of the right electric motor when the speed difference between the rotational speeds of the left and right electric motors exceeds the speed difference threshold, reduces the speeds of the left and right electric motors, respectively, by left and right control signal outputs according to the ratio, and simultaneously operates the left and right braking devices when at least one of the rotational speeds is reduced to the rotational speed threshold.

5. An electric vehicle comprising:
a directional speed member operable to instruct the forward travel, neutral state and reverse travel of the vehicle;
a pair of left and right electric motors rotatable in forward and reverse directions in accordance with the operation of the directional speed member for propelling the vehicle;
a drive preparatory member which, when turned on, brings the pair of left and right electric motors into a drivable state, and when turned off, brings the electric motors into a drive stopped state;
a pair of left and right braking devices for applying a braking force to the left and right electric motors when the directional speed member is in neutral; and
a controller for gradually reducing a drive control signal to the pair of left and right electric motors so as to reduce the rotational speeds thereof, and thereafter operating the left and right braking devices, wherein the controller reduces the speeds of the pair of left and right electric motors when, during vehicle travel, the drive preparatory member is turned off or the directional speed member is turned to a neutral state, and a speed difference between the rotational speeds of the left and right electric motors is within a speed difference threshold, and simultaneously operates the pair of left and right braking devices when the rotational speed of at least one of the electric motors is reduced to a rotational speed threshold and the controller determines the ratio between the rotational speed of the left electric motor and the rotational speed of the right electric motor when the speed difference between the rotational speeds of the left and right electric motors exceeds the speed difference threshold, reduces the speeds of the left and right electric motors, respectively, by left and right control signal outputs according to the ratio, and simultaneously operates the left and right braking devices when at least one of the rotational speeds is reduced to the rotational speed threshold.

* * * * *